United States Patent [19]
Wickramanayake et al.

[11] Patent Number: 6,019,827
[45] Date of Patent: Feb. 1, 2000

[54] RELIABILITY ENHANCEMENT OF MICROEMULSION-BASED INK-JET INKS

[75] Inventors: Palitha Wickramanayake; Dennis P. Parazak, both of Corvallis, Oreg.

[73] Assignee: Hewlett-Packard Company, Palo Alto, Calif.

[21] Appl. No.: 08/892,769

[22] Filed: Jul. 15, 1997

Related U.S. Application Data

[63] Continuation-in-part of application No. 08/741,147, Oct. 29, 1996, Pat. No. 5,713,989, which is a continuation-in-part of application No. 08/610,687, Mar. 4, 1996, abandoned, which is a continuation-in-part of application No. 08/528,077, Sep. 14, 1995, Pat. No. 5,531,816.

[51] Int. Cl.[7] .................................................. C09D 11/02
[52] U.S. Cl. ................................. 106/31.25; 106/31.58; 106/31.59
[58] Field of Search ............................ 106/31.25, 31.58, 106/31.59

[56] References Cited

U.S. PATENT DOCUMENTS

| | | | |
|---|---|---|---|
| 4,963,189 | 10/1990 | Hindagolla | 106/31.52 |
| 5,106,416 | 4/1992 | Moffatt et al. | 106/31.43 |
| 5,116,409 | 5/1992 | Moffatt | 106/31.43 |
| 5,133,803 | 7/1992 | Moffatt | 106/31.37 |
| 5,181,045 | 1/1993 | Shields et al. | 347/100 |
| 5,198,023 | 3/1993 | Stoffel | 106/31.32 |
| 5,226,957 | 7/1993 | Wickramanayake et al. | 106/31.26 |
| 5,342,440 | 8/1994 | Wickramanayake | 106/31.43 |
| 5,492,559 | 2/1996 | Oliver et al. | 106/31.25 |
| 5,531,816 | 7/1996 | Wickramanayake | 106/31.78 |
| 5,551,973 | 9/1996 | Oliver et al. | 106/31.25 |
| 5,565,022 | 10/1996 | Wickramanayake | 106/31.25 |
| 5,713,989 | 2/1998 | Wickramanayake et al. | 106/31.25 |

FOREIGN PATENT DOCUMENTS

0595523B1  2/1997  European Pat. Off. .

*Primary Examiner*—Helene Klemanski

[57] ABSTRACT

An aqueous microemulsion-based ink-jet ink composition is provided which employs a second organic solvent that is miscible with both the discontinuous and the continuous phase. Specifically, the ink-jet ink composition of the present invention comprises at least one dye; and a microemulsion comprising at least one high boiling water-insoluble organic compound, at least a second high boiling compound miscible with both aqueous and organic phases, at least one amphiphile, and water, wherein the amphiphile is present in an amount sufficient to solubilize the water-insoluble organic compound.

28 Claims, 2 Drawing Sheets

RELIABILITY ENHANCEMENT OF MICROEMULSION-BASED INK-JET INKS

CROSS REFERENCE TO RELATED APPLICATIONS

The present application is a continuation-in-part of application Ser. No. 08/741,147, filed Oct. 29, 1996, now U.S. Pat. No. 5,713,989 which in turn is a continuation-in-part of application Ser. No. 08/610,687, filed Mar. 4, 1996, now abandoned which in turn is a continuation-in-part of application Ser. No. 08/528,077, filed on Sep. 14, 1995, now U.S. Pat. No. 5,531,816, issued Jul. 2, 1996. The present application is also related to application Ser. No. 08/528,072, likewise filed on Sep. 14, 1995, now U.S. Pat. No. 5,565,022, issued Oct. 15, 1996. The latter related application is entitled "Fast Drying, Bleed-Free Ink-Jet Ink Compositions" and is directed to bleed control of dye-based ink-jet ink compositions.

FIELD OF INVENTION

The present invention relates to ink compositions employed in ink-jet printing and, more particularly, to the reduction of bleed and improvement of dry time of ink-jet ink compositions having substantially reduced dry times and yielding bleed-free prints while achieving high reliability printing performance.

BACKGROUND OF INVENTION

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Ink-jet printers offer low cost, high quality printing with relatively noise-free operation. As such, ink-jet printers have become a popular alternative to other types of printers. However, ink-jet printers are presently incapable of matching the level of throughput generated by laser printers due in large part to the relatively slow dry time of ink-jet inks as well as to the printer slow-down deriving from the resident bleed control algorithm in the printer. With particular regard to bleed control, there is a tendency among ink-jet inks to bleed into one another when printed in various colors on paper substrates. Bleed occurs as colors mix both on the surface of the paper substrate as well as within the substrate itself. In response to this problem, ink-jet printers commonly employ bleed control algorithms in an attempt to provide a border between colors that is clean and free from the invasion of one color into another; however, this slows down the printer. In order to increase the level of throughput generated by ink-jet printers, the dry time of ink-jet inks should be improved, preferably in a manner that also affects bleed control.

Various solutions to the problem of black to color and color to color bleed have been proffered. Some solutions involve changing the ink environment to reduce bleed. For instance, heated platens and other heat sources, along with specially formulated paper, have been employed to reduce bleed. However, heated platens add cost to the printer, and specially formulated paper is more expensive than "plain" paper. Thus, using external paraphernalia to reduce bleed in ink-jet color printing is generally not cost effective. Another commonly employed method for reducing bleed involves the use of bleed control algorithms in ink-jet printers to provide borders between colors that are clean and free from the invasion of one color into another; however, such algorithms slow down the printer.

Other proposed solutions to the problem of bleed involve changing the composition of an ink-jet ink. For example, surfactants have been effectively used to reduce bleed in dye-based ink formulations; see, e.g., U.S. Pat. No. 5,106,416 entitled "Bleed Alleviation Using Zwitterionic Surfactants and Cationic Dyes", issued to John Moffatt et al., U.S. Pat. No. 5,116,409 entitled "Bleed Alleviation in Ink-Jet Inks", issued to John Moffatt, and U.S. Pat. No. 5,133,803 entitled "High Molecular Weight Colloids Which Control Bleed", issued to John Moffatt, all assigned to the same assignee as the present application. However, surfactants increase the penetration rate of the ink into the paper, which may also result in the reduction of edge acuity. Moreover, the addition of surfactant-containing inks could cause puddles on the nozzle plates of the printhead, leading to poor drop ejection characteristics. Other solutions specific to dye-based ink compositions, disclosed in patents assigned to the present assignee, are found in U.S. Pat. No. 5,198,023, entitled "Cationic Dyes with Added Multi-Valent Cations to Reduce Bleed in Thermal Ink-Jet Inks", issued to John Stoffel, and U.S Pat. No. 5,181,045, entitled "Bleed Alleviation Using pH Sensitive Dyes, issued to James Shields et al., both assigned to the same assignee as the present application.

U.S. Pat. No. 5,565,022, entitled "Fast Drying, Bleed-Free Ink-Jet Ink Compositions," assigned to the same assignee as the present application, and incorporated herein by reference, is directed to bleed control of dye based ink compositions wherein the dye is either water-soluble or water-insoluble (i.e., solvent-soluble dye). More specifically, bleed control for such inks is achieved by dissolving the dye in either water or the solvent depending on the nature of the dye. The ink is in the form of a microemulsion which is an isotopic solution of water, a water-insoluble organic compound, and an amphiphile, there being sufficient amphiphile to solubilize the water-insoluble compound in water.

U.S. Pat. No. 5,531,816, entitled "Bleed-Alleviated, Waterfast, Pigment-Based Ink-Jet Ink Compositions," and U.S. patent application Ser. No. 08/741,147, filed Oct. 29, 1996, entitled "Bleed Alleviated Aqueous Pigment Dispersion-Based Ink-Jet Ink Compositions," both assigned to the same assignee as the present application, and incorporated herein by reference, are directed to bleed control of solvent-dispersed pigment-based, and aqueous pigment-based ink-jet ink compositions, respectively. More specifically, bleed control for such inks is achieved by dispersing the pigment and keeping it in solution in the form of a microemulsion. Again, however, these solutions to bleed are not directed to dye-based inks, but rather are specifically directed to dispersed pigment-based inks.

In addition to desiring bleed control in ink-jet ink formulations, it is also universally desired to develop ink formulations with improved dry times in ink-jet printing in order to gain in throughput. Ink-jet printers are presently incapable of matching the level of throughput generated by laser printers, due in large part to the relatively slow dry time of ink-jet inks as well as to printer slowdown deriving from the resident bleed control algorithms in the printer. The solutions used to effect bleed control described above also typically improve dry times, these two attributes being closely associated with one another.

Furthermore, the suitable ink-jet ink has to provide for reliable printing. As the ink-jet pen idles and is exposed to the atmosphere, the water in the ink vehicle evaporates. This evaporation can lead to formation of crusts at the nozzles which in turn negatively affects the pen reliability. Thus, there is a need for ink compositions that can minimize crusting.

Accordingly, a need exists for dye-based inks for use in ink-jet printing that evidence reduced bleed and dry rapidly upon impact with the print medium with enhanced reliability performance. However, the print quality of the ink composition must not be sacrificed in order to achieve faster dry times.

DISCLOSURE OF INVENTION

In accordance with the invention, an aqueous microemulsion-based ink-jet ink composition is provided which employs a second organic solvent that is miscible with both the discontinuous and the continuous phase. Specifically, the ink-jet ink composition of the present invention comprises at least one dye, and a microemulsion comprising at least one high boiling water-insoluble organic compound, at least a second high boiling organic compound miscible with both aqueous and organic phases, at least one amphiphile, and water, wherein the amphiphile is present in an amount sufficient to solubilize the water-insoluble organic compound.

Any colorant suitable for use in ink-jet printing may benefit in the practice of the invention, so long as it remains compatible with the remaining components in the ink-jet ink composition. The microemulsion is a thermodynamically stable isotropic solution in which the interfacial tension between the water and the water-insoluble organic compound has been minimized by the amphiphile. As used herein, the term "high boiling organic compound" refers to an organic compound having a vapor pressure that is sufficiently low in comparison to that of water that only water evaporates from the ink during the normal operation of ink-jet printing. Also, as used herein, the term "second organic compound miscible with both the water and the water-insoluble organic compound" refers to a compound having a miscibility of at least 10%, both in water and in the water-insoluble organic compound.

A method of reducing bleed in ink-jet printing is also provided which involves providing the above described ink and printing the same onto a print medium. Since typical color ink-jet printers employ an ink set having three color inks and a single black ink, it is contemplated that any or all of the four inks may be formulated according to the present invention to achieve high quality printing with reduced bleed. Preferably all four inks in a set of ink-jet inks would be formulated in accordance with the invention, such that the print quality optimally benefits from improved dry time, bleed control, uniformity of coverage and thickness, and enhanced reliability.

The ink-jet inks formulated in accordance with the invention exhibit fast dry times and bleed control, while the degree of edge acuity achieved may be controlled by the choice of the amphiphile. More particularly, superior print quality in the form of good edge acuity is achieved in addition to fast dry times and bleed control by specifically employing a hydrotrope. Hydrotropes are a subset of the general class of amphiphiles and are characterized by their ability to solubilize water-insoluble organic compounds such that the resulting isotropic solution occupies a relatively large area in the phase diagram and has a relatively high surface tension in comparison to that of solutions made by the use of surfactants. Typically, superior print quality is desired for printing onto a paper medium, such that one may preferentially employ a hydrotrope to solubilize the water-insoluble organic compound. On the other hand, a lesser print quality may be acceptable in some applications, such as printing on textile media, such that one may employ surfactants to solubilize the water-insoluble organic compound.

Furthermore, the reliability of the ink-jet pen is enhanced by the use of a second organic compound that is miscible with both the aqueous and the organic phases, and water. The added second organic compound inhibits the formation of crusts or beards on the nozzle plate and thus, enhances the pen reliability.

Notably, since the present ink vehicles contain both a water-insoluble organic compound and water, either water-soluble or water-insoluble dyes may be employed in the practice of the invention, although water-insoluble dyes may be preferred for their inherent waterfastness.

The present ink-jet ink compositions and method of reducing bleed and enhancing pen reliability may be used with a variety of ink-jet printers such as continuous, piezo-electric drop-on-demand printers and thermal or bubble jet drop-on-demand printers. Printing may be done on a variety of media; examples include paper, textiles, and transparencies. The reduction of bleed and dry time improvement achieved in the practice of the invention enable ink-jet printers to effect high print qualities in a cost effective manner.

DETAILED DESCRIPTION OF THE INVENTION

Microemulsion-based ink-jet ink vehicles consist of two liquid phases: the discontinuous oil phase and the continuous aqueous phase. The colorant may be present in either of the two phases. The colorant may be a water-soluble dye solubilized in the aqueous phase or a water-insoluble dye solubilized in the organic compound, preferably the dye is water-insoluble.

The solubilizer—the most preferred class being hydrotropes—mainly resides at the oil-water interface. However, solubilizers also reside in the aqueous phase due to their solubility in water (especially so in the case of hydrotropes).

When a pen containing an ink made with a vehicle as described above idles, water—but not the high boiling water-insoluble organic compound (oil) or the high boiling second organic solvent—evaporates from the nozzles. The presence of the water-insoluble organic compound inhibits crust formation (also known as a beard in worst cases), if any, resulting from the water-insoluble material which is present in the organic phase. The presence of the water-miscible second organic solvent inhibits crust formation resulting from the material that is present in the continuous phase. This inhibition of crust formation by the second organic compound enhances the reliability of the ink-jet pen.

In the practice of the invention, the bleed alleviation, fast dry times, and enhanced reliability are exhibited by employing a microemulsion as the ink vehicle. More specifically, the ink-jet ink composition of the present invention comprises at least one colorant, and a microemulsion comprising at least one water-insoluble organic compound, at least one amphiphile, at least a second organic compound miscible with both aqueous and organic phases, and water. The amphiphile is present in an amount that completely solubilizes the water-insoluble organic compound, thereby resulting in a clear, stable microemulsion. The second organic solvent is miscible with both the discontinuous and the continuous phase of the vehicle.

All concentrations herein are in weight percent, unless otherwise indicated. The purity of all components is that employed in normal commercial practice for ink-jet inks.

Dye

Dyes that may be employed in the practice of the invention include both water-soluble and water-insoluble dyes. Any water-soluble or water-insoluble dye that is compatible with ink-jet printing may be suitably employed in the practice of the invention. Examples of water-soluble dyes that may suitably be employed in the practice of the invention include, but are not limited to, C. I. Acid Blue 9, C. I. Acid Red 18, C. I. Acid Red 27, C. I. Acid Red 52, C. I. Acid Yellow 23, and C. I. Direct Blue 199, and their monovalent alkali earth ions such as $Na^+$, $Li^+$, $Cs^+$, $NH_4^+$, and substituted ammonium salts. Examples of water-insoluble dyes that may suitably be employed in the practice of the invention include, but are not limited to, Isol Yellow, Isol Red, Isol Orange, Isol Black, and Solvent Blue B, all of which are commercially available from Crompton & Knowles (Charlotte, N.C.); Sepisol Fast Black CN, Sepisol Fast Blue MBSN II, Sepisol Fast Red SB, and Sepisol Fast Yellow TN, all commercially available from BIMA 83 (Cemay, France), and Solvent Red 218. The dye(s) is present from about 0.1 to about 10 wt % in the ink composition.

Vehicle

Microemulsions are defined as thermodynamically stable isotropic "solutions" of water, oil, and amphiphile and are used to solubilize water-insoluble compounds. In the practice of the invention, the microemulsion comprises water, at least one water-insoluble organic compound, at least one amphiphile, at least a second organic compound miscible with both aqueous and organic phases, and water. The second organic solvent is miscible with both the discontinuous and the continuous phase of the vehicle. Within the microemulsion composition, the function of the amphiphile is to lower the interfacial tension between water and the water-insoluble organic compound, thereby forming a stable system. The amphiphile is present in an amount that completely solubilizes the water-insoluble organic compound, thereby resulting in a clear, stable microemulsion.

Water-Insoluble Organic Compound

Examples of water-insoluble organic compounds that may be suitably employed in the practice of the invention include, but are not limited to, water-insoluble ethyleneoxy- and propyleneoxy- oils, water-insoluble mono- or polyglycol ethers; water-insoluble mono- or polyglycol phenyl ethers; water-insoluble alcohols; water-insoluble polyols, water-insoluble mono- or polyglycol esters; water-insoluble terpenes; water-insoluble phenols; water-insoluble aldehydes and ketones; water-insoluble hydrocarbons, and water-insoluble polyether modified polysiloxanes. In general, any water-insoluble organic compound, or combination thereof, may be employed in the practice of the invention so long as it may be solubilized by an amphiphile and so long as it is compatible with the other components in the ink-jet ink composition. Specific examples of water-insoluble organic compounds that are preferably employed in the practice of the invention include, but are not limited to: (1) ethylene, propylene, polyethylene, and polypropylene glycol phenyl ethers; (2) ethylene, propylene, polyethylene, and polypropylene glycol esters such as acrylates; and (3) benzyl alcohol. Additionally, specific examples of preferably employed hydrocarbons include toluene, xylenes, naphthalene, and phenanthrene. Further examples of the water-insoluble organic compounds include alpha-terpineol, citronellal, hydroxy citronellal, cyclohexyl methanol, cyclohexanone and its alkyl ($C_1$ to $C_8$) derivatives, cyclohexanol and its alkyl ($C_1$ to $C_8$) derivatives, cyclopentanone and its alkyl ($C_1$ to $C_8$) derivatives, cyclopentanol and its alkyl ($C_1$ to $C_8$) derivatives, eugenol, 1-heptanol, n-hexanol, 2-hexanol, n-pentanol, cinnamyl alcohol, 2-ethyl-1,3-hexanediol, 7-octene-1,2-diol, 2,2-diethyl-1,3-propanediol, 1-benzyl-2-pyrrolidinone, polycaprolactone triol, cinnamaldehyde, m-cresol, 3-phenyl-1-propanol, salicylaldehyde and water-insoluble polyether modified polysiloxanes such as GP-226 available from Genesee Polymers (Flint, Mich.) and Addid 210 available from Wacker (Adrian, Mich.). Mono- and diethylene glycol phenyl ether, mono- and dipropylene glycol phenyl ether, and benzyl alcohol are most preferably employed in the practice of the invention.

The water-insoluble organic component may range in concentration from about 1 to about 70 wt % of the ink-jet ink composition, and preferably, from about 1 to about 30wt %.

In addition to providing the microemulsion with an oil component, the water-insoluble organic component serves as a co-solvent in the present ink-jet ink compositions such as commonly employed in ink-jet printing. More particularly, when the pen of the ink-jet printer idles and is exposed to the atmosphere, the water in the ink vehicle evaporates. The presence of this co-solvent in the ink vehicle prevents crust formation and nozzle clogging. Hence, the vapor pressure of the organic compound should be sufficiently low in comparison to that of water that it does not evaporate during the normal operation of ink-jet printing. It is noted that an advantage to increasing the concentration of the water-insoluble organic component in the present ink-jet ink compositions is a reduction in paper cockle, which derives from the attendant decrease in the water content of the ink.

Miscible Organic Solvent

The second organic solvent is miscible with both the discontinuous and the continuous phase. As used herein, the term "second organic compound miscible with both the water and the water-insoluble organic compound" refers to a compound having a miscibility of at least 10%, both in water and in the water-insoluble organic compound. This added solvent, which also functions as a co-solvent, reduces the formation of crusts or beards and enhances the pen reliability. Organic solvents suitably employed in the present invention include, but are not limited to, alkanolamines; lactams such as 2-pyrrolidone; glycols; diols such as 1,2- or 1,5-pentanediol; triols; glycol esters; mono- and di- glycol ethers, including ethylene glycol mono butyl ether, diethylene glycol ethers, diethylene glycol mono ethyl, butyl, hexyl ethers, propylene glycol ether, dipropylene glycol ether, and triethylene glycol ether; mid chain alcohols such as 2-pentyl alcohol; oxyalkylated alcohols such as Alfonic 610-3.5 or 810-2 available from Vista Chemical Co. (Houston, Tex.); acetylenic polyethylene oxides, and polyethylene and polypropylene oxides. The second solvent may represent from about 0.1% to about 20% of the ink composition. Preferably it may represent from about 0.1% to about 15%, and most preferably from about 0.1% to about 10% of the ink composition. Preferably, triethanolamine (TEA), pentanediol (PDIOL), 2-pyrrolidone (2P), or a mixture thereof, is used.

Amphiphile

The amphiphile employed in the practice of the invention may be any amphiphile that yields a microemulsion with the water-insoluble organic compound and water, preferably a hydrotropic amphiphile is used. Suitable hydrotropic amphiphiles, like other surfactants in general, solubilize the water-insoluble organic compound in water by breaking the compound into very small droplets and maintaining these droplets in a microemulsion. However, unlike other classes of surfactants, hydrotropic amphiphiles yield relatively large microemulsion regions in the phase diagram, thus making them more suitable for ink-jet applications—large microemulsion region in the phase diagram translates to wider range of vehicle compositions to choose from for formulating the ink. A large microemulsion region in the phase diagram also provides for more robust ink compositions such that changes in the composition (e.g., due to evaporation) during pen idle do not adversely affect the pen performance. Furthermore, hydrotropic amphiphiles do not result in the precipitous drop in surface tension associated with the use of other surfactants, such that the reduction in surface tension for inks employing hydrotropic amphiphiles in the practice of the invention is curbed in comparison. In contrast, the steep drop in surface tension caused by the incorporation of other surfactants into ink-jet inks is known to cause puddles on the nozzle plates of the printhead, thereby negatively affecting drop ejection characteristics. Moreover, these other surfactants increase the penetration rate of the ink into the paper to such a degree that edge acuity may be affected. Thus, hydrotropic amphiphiles serve to solubilize the water-insoluble organic compound without risking (1) pen reliability; (2) puddling on the nozzle plate; or (3) loss of edge acuity.

Examples of common non-hydrotropic amphiphiles (surfactants) include alkyl sulfonates, alkyl substituted benzene sulfonates, naphthalene sulfonates, alkylamine oxides, substituted ammonium salts, and the non-ionics.

The hydrotropic amphiphile may be anionic, cationic, or non-ionic in nature. Examples of anionic hydrotropic amphiphiles suitably employed in the practice of the invention include, but are not limited to, salts of benzoic acid, salicylic acid, benzene acid, benzene disulfonic acid, toluene sulfonic acid, xylene sulfonic acid, cumene sulfonic acid, cymene-sulfonic acid, cinnamic acid, octane sulfonic acid, hexane sulfonic acid, butane sulfonic acid, and decane sulfonic acid. The cation associated with these salts may be $Na^+$, $K^+$, $Li^+$, or $NH_{4+}$. Preferably, the anionic hydrotropic amphiphile is sodium xylene sulfonate, sodium salicylate, or sodium benzoate.

Examples of cationic hydrotropic amphiphiles suitably employed in the practice of the invention include, but are not limited to, p-amino benzoic acid hydrochloride, procaine hydrochloride, caffeine; and salts of alkylpyridium, alkyltrimethyl ammonium, benzyltrialkyl (C1 to C4) ammonium, and phenyltrimethyl ammonium cations. The anion associated with these salts may be any of the halides, particularly $Cl^-$.

Examples of non-ionic hydrotropic amphiphiles suitably employed in the practice of the invention include, but are not limited to, resorcinol and pyrogallol.

The proper amount of amphiphile in the microemulsion is that amount that solubilizes the water-insoluble organic compound. It is noted that a mixture of amphiphiles may be employed in the practice of the invention. The determination of the amount of a given amphiphile and its concentration is considered not to constitute undue experimentation in view of the teachings of this invention.

The amount of amphiphile appropriately employed in a particular microemulsion may be determined in at least two ways, namely by an abbreviated method or a more systematic method. In the abbreviated method, one must first combine the water-insoluble organic compound(s), the second organic compound(s) and water in a ratio that reflects the desired final composition of the microemulsion for the ink-jet ink composition. The resulting two-phase liquid is thereafter titrated with the selected amphiphile(s) until a clear solution is obtained, representing the solubilization of the organic compound such that a single-phase solution is achieved. About 1% excess amphiphile may optionally be added to ensure a stable solution. Thus, the appropriate relational concentrations of the water-insoluble organic compound(s), the second organic compound(s), water, and amphiphile(s) are determined through the above-described titration process.

Figure 1:
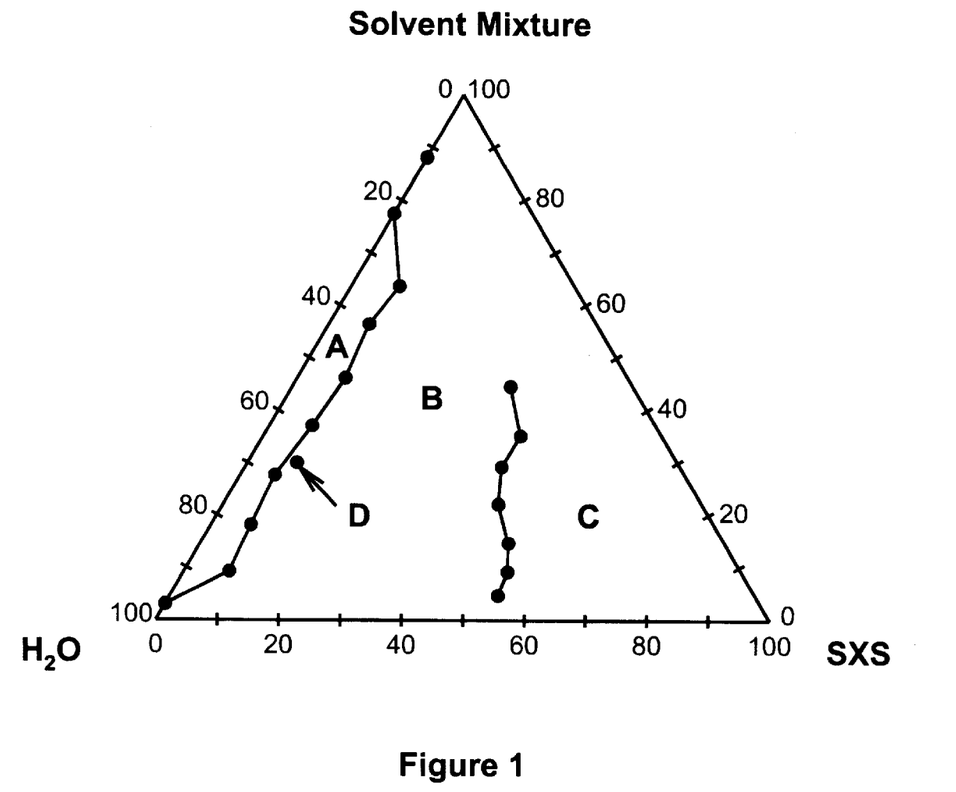
FIG. 1 is a ternary phase diagram showing the composition regions of the microemulsion-based vehicle component of ink-jet ink compositions made in accordance with the invention, the microemulsion component having a particular combination of at least one water-insoluble organic compound, at least one second organic compound miscible with both aqueous and organic phases, at least one amphiphile, and water.

In the event one chooses to determine the appropriate amount of amphiphile(s) in a more systematic approach, the first step involves the construction of a phase diagram to represent the combination of the water-insoluble organic compound, the second organic solvent, and water. More specifically, a phase diagram is constructed by combining water, the water-insoluble organic compound(s), and the second organic solvent(s) in various proportions, titrating each mixture against the amphiphile(s) until a clear, single-phase region is determined within the phase diagram (the first end-point). By further titrating beyond the first end-point, other regions of multi-phase or semi-solid compositions can be determined (the second end-point). These results, when plotted on a conventional triangular plot, represent a partial ternary phase diagram. For example, FIG. 1 depicts such a ternary phase diagram for a microemulsion comprising 1-pentanol (the water-insoluble organic solvent), 1,2-pentanediol (the second organic solvent), sodium xylene sulfonate (SXS) (the hydrotrope), and water, wherein Area A represents a milky region having two phases, Area B represents a single-phase isotropic region, and Area C represents a semi-solid region. The single-phase isotropic region (Area B of FIG. 1) indicates vehicle compositions of organic compound(s), water, and amphiphile(s) that are most suitable for use in an ink-jet ink application. Thus, one may select any composition from this single-phase region in the practice of the invention, provided the composition meets other criteria for the particular ink-jet ink application. The second organic solvent partitions between the continuous and discontinuous phases.

It should be noted that compositions within Area A may be employed in those applications not requiring a long shelf life, such as textile printing. Likewise, use of a heated print cartridge could permit compositions within Area C to be employed.

Consistent with the requirements for this invention, various types of additives may be employed in the ink to optimize the properties of the ink composition for specific applications. For example, as is well known to those skilled in the art, one or more biocides, fungicides, and/or slimicides (microbial agents) may be used in the ink composition as is commonly practiced in the art. Examples of suitably employed microbial agents include, but are not limited to, NUOSEPT (Nudex, Inc.), UCARCIDE (Union Carbide), VANCIDE (R. T. Vanderbilt Co.), and PROXEL (ICI America). Additionally, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

EXAMPLES

Example 1

An ink-jet ink composition was prepared comprising 3 wt. % C. I. Solvent Red 218 dye, 22.5 wt. % 1-pentanol, 7.5 wt. % 1,2-pentanediol, 8 wt. % sodium xylene sulfonate (SXS) and the balance water, with the concentrations of the vehicle components being determined by the phase diagram depicted in FIG. 1. More specifically, the phase diagram depicted in FIG. 1 was constructed by combining an organic solvent mixture, comprising of a 3:1 ratio of 1-pentanol to 1,2-pentanediol, and water in various proportions and then titrating each mixture against SXS until a clear single phase region was determined. Thus, Area A of FIG. 1 represents the various combinations of the organic solvent mixture, SXS and water that yielded a two phase region as evidenced by a milky appearance. Area B of FIG. 1 represents the various combinations of the organic solvent mixture, SXS and water that yielded a clear single phase region (microemulsion region). Area C of FIG. 1 was defined by further titrating the organic solvent mixture, SXS and water beyond the clear point until a semi-solid or multi-phase region was observed (second end-point). The single phase isotropic region Area B of FIG. 1 represents compositions of 1-pentanol, 1,2-pentanediol, SXS and water that may be suitably employed in the practice of the invention.

The ink-jet composition of this example falls within the single phase isotropic region of Area B of in FIG. 1. More specifically, the vehicle of this ink composition contained 22.5 wt. % 1-pentanol, 7.5 wt. % 1,2-pentanediol, 8% SXS and 62 wt. % water. Point D on FIG. 1 indicates that the vehicle of this example ink composition indeed falls within the clear single-phase region Area B of the ternary phase diagram.

Figure 2:
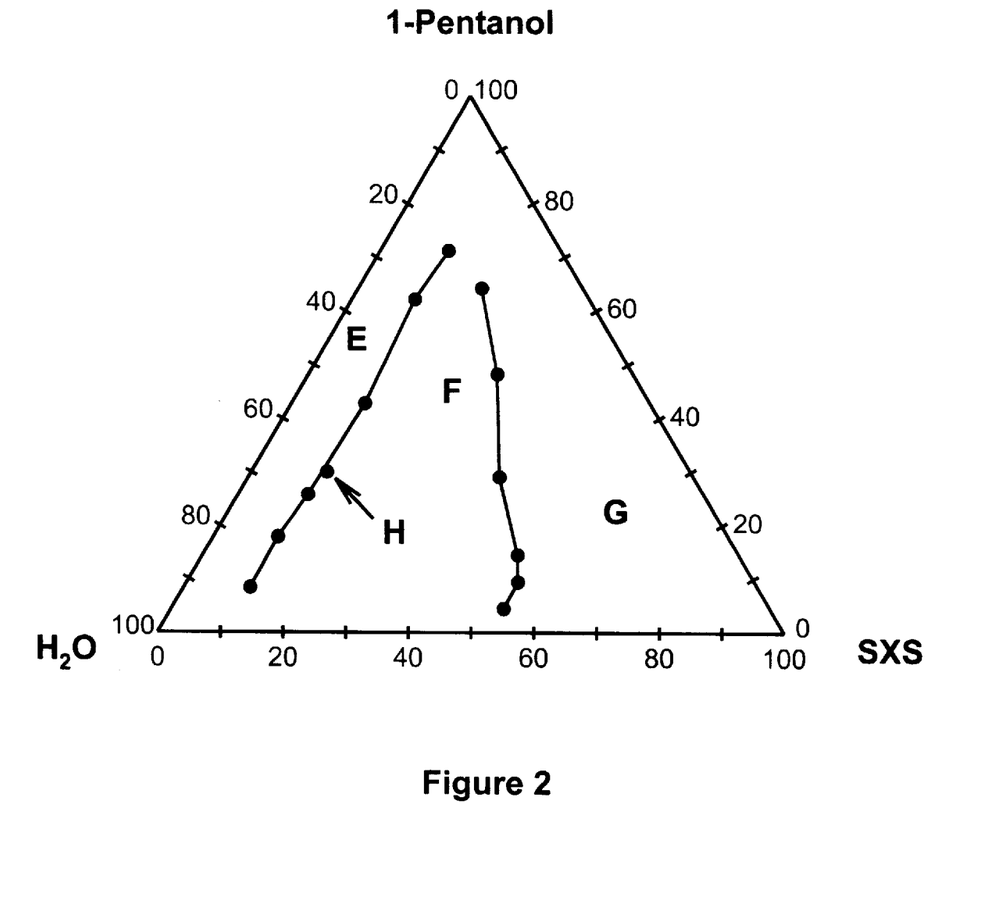
FIG. 2 is a ternary phase diagram showing the composition regions of the microemulsion-based vehicle component of ink-jet ink compositions, the microemulsion component having a particular combination of at least one water-insoluble organic compound, at least one amphiphile, and water.

In order to demonstrate the usefulness of adding a miscible organic solvent, a second ink was prepared where the 1,2-pentanediol of the first ink was substituted with an equal amount of 1-pentanol. Thus, a second ink-jet ink was prepared comprising 3 wt. % C. I. Solvent Red 218 dye, 30 wt. % 1-pentanol, 12 wt. % SXS and the remainder water, with the concentrations of the vehicle components being determined by the phase diagram depicted in FIG. 2. The phase diagram depicted in FIG. 2 was constructed in the same manner as that in FIG. 1 but using 1-pentanol instead of the 3:1 mixture of 1-pentanol and 1,2-pentanediol. Compositions indicated by Areas E, F, and G of FIG. 2 have analogous physical characteristics to those described for Areas A, B and C of FIG. 1, respectively. The ink-jet composition of this second ink falls within the single phase isotropic region of Area F in FIG. 2. More specifically, the vehicle of this ink composition contained 30 wt. % 1-pentanol, 12% SXS and 58 wt. % water. Point H on FIG. 2 indicates that the vehicle of this ink composition indeed falls within the clear single-phase region Area F of the ternary phase diagram.

The inks were filled into ink-jet pens such as those used as color pens in the Deskjet 660C printer available from Hewlett-Packard Company (Palo Alto, Calif.) and printed. The pens were then idled uncapped for three days and thereafter were checked for crust and beard formation on the nozzle plates. Pens filled with the first ink (with the second organic compound, 1,2-pentanediol) showed no signs of beard formation and printed without the need for any interventions. Pens containing the second ink (without the second organic compound, 1,2-pentanediol) exhibited formation of beards as high as about 1 millimeter in height; manual or printer interventions were needed prior to printing.

Example 2

Three ink compositions were made comprising 25% ethylene glycol phenyl ether (EPh); 8% SXS; and a colorant such as 3% Isol Red, Isol Yellow, Solvent Blue B, all from Crompton and Knowles; and the balance water. A second set of inks was made which also comprised 5% TEA (substituting for 5% water). The inks were filled into ink-jet pens such as those used as color pens in the Deskjet 660C printer available from Hewlett-Packard Company, Palo Alto, Calif. The pens were idled for three days and thereafter checked for the formation of beards on the nozzle plates. The first set of three pens (without the second organic compound, TEA) exhibited formation of beards as high as about 1 to 2 millimeters in height; manual or printer interventions were needed prior to printing. The second set of three pens (with TEA) showed no signs of beard formation and they printed without the need for any interventions.

To formulate the ink-jet ink composition, the following procedures are followed, depending on the type of colorant used:

Once a vehicle is chosen, one may use a water-soluble or a water-insoluble dye to make inks. It is very possible to combine all the ingredients of the chosen vehicle and the dye (water-soluble or water-insoluble) and mix until a homogeneous mix is achieved. However, this may be time consuming. Instead, one may first dissolve the water-soluble dye in water, such that in the final ink composition the desired dye concentration is obtained, and then add the rest of the ingredients of the ink composition. In the case of water-insoluble dyes, one may first dissolve the dye in the water-insoluble organic solvent, such that in the final ink composition the desired dye concentration is obtained, and then add the rest of the ingredients of the ink composition.

INDUSTRIAL APPLICABILITY

The present ink-jet ink compositions and method for controlling bleed and reducing dry time with enhanced reliability in ink-jet printing as disclosed herein are expected to find commercial use in ink-jet printing.

Thus, there has been disclosed ink-jet ink composition as well as a method of controlling bleed and reducing dry time with enhanced reliability in ink-jet printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A dye-based ink-jet ink composition, comprising:
    at least one dye; and
    a microemulsion comprising
        at least one water-insoluble organic compound;
        at least one second organic solvent miscible with the water-insoluble organic compound and water and having a miscibility of at least 10% both in water and in the water-insoluble organic compound;
        at least one hydrotropic amphiphile; and
        water, wherein said hydrotropic amphiphile is present in an amount sufficient to solubilize said at least one water-insoluble organic compound in said microemulsion.

2. The composition of claim 1 wherein said at least one dye is present in an amount (up to) from about 0.1 to about 10 wt %.

3. The composition of claim 1 wherein said at least one water-insoluble organic compound is selected from the group consisting of water-insoluble ethyleneoxy oils, water-insoluble propyleneoxy oils, water-insoluble monoglycol ethers, water-insoluble polyglycol ethers, water-insoluble monoglycol phenyl ethers, water-insoluble polyglycol phenyl ethers, water-insoluble alcohols, water-insoluble monoglycol esters, water-insoluble polyglycol esters, water-insoluble terpenes, water-insoluble phenols, water-insoluble aldehydes and ketones, water-insoluble polyether modified polysiloxanes, and water-insoluble hydrocarbons.

4. The composition of claim 3 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, phenanthrene, benzyl alcohol, alpha-terpineol, citronellal, hydroxy citronellal, cyclohexyl methanol, cyclohexanone and its (C1 to C8) derivatives, cyclohexanol and its alkyl (C1 to C8) derivatives, cyclopentanone and its (C1 to C8) derivatives, cyclopentanol and its alkyl (C1 to C8) derivatives, eugenol, 1-heptanol, n-hexanol, 2-hexanol, n-pentanol, cinnamyl alcohol, cinnamaldehyde, m-cresol, 3-phenyl-1-propanol, salicylaldehyde, 2-ethyl-1,3-hexanediol, 7octene-1,2-diol, 2,2-diethyl-1,3-propanediol, 1-benzyl-2-pyrrolidinone, polycaprolactone triol, and 3-phenyl-1-propanol.

5. The composition of claim 4 wherein said at least one water-insoluble organic compound is selected from the group consisting of monoethylene glycol phenyl ether, diethylene glycol phenyl ether, monopropylene glycol phenyl ether, dipropylene glycol phenyl ether, and benzyl alcohol.

6. The composition of claim 1 wherein said at least one water-insoluble organic compound is present in said ink-jet ink composition in an amount ranging from about 1 to about 70 wt %.

7. The composition of claim 6 wherein said at least one water-insoluble organic compound is present in said ink-jet ink composition in an amount ranging from about 1 to about 30 wt %.

8. The composition of claim 1 wherein said at least one hydrotropic amphiphile is selected from the group consisting of salts of benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, and decane sulfonic acid; p-amino benzoic acid hydrochloride, procaine hydrochloride, caffeine; salts of alkylpyridium, alkyltrimethyl ammonium, benzyltrialkyl (C1 to C4) ammonium, and phenyltrimethyl ammonium cations; resorcinol, and pyrogallol.

9. The composition of claim 8 wherein said at least one hydrotropic amphiphile is selected from the group consisting of sodium xylene sulfonate, sodium salicylate, and sodium benzoate.

10. The composition of claim 1 wherein said at least one second organic solvent is selected from the group consisting of alkanolamines, lactams, glycols, diols, triols, glycol esters, mono- glycol ethers, di- glycol ethers, mid chain alcohols, oxyalkylated alcohols, acetylenic polyethylene oxides, polyethylene oxides, and polypropylene oxides.

11. The composition of claim 10 wherein said at least one second organic solvent is selected from the group consisting of 2-pyrrolidone, 1,2-pentanediol, 1,5pentanediol, ethylene glycol mono butyl ether, diethylene glycol mono ethyl ether, diethylene glycol mono butyl ether, diethylene glycol mono hexyl ether, propylene glycol ether, dipropylene glycol ether, triethyleneglycol ether, 2-pentyl alcohol, acetylenic polyethylene oxide, polyethylene oxide, and polypropylene oxide.

12. The composition of claim 1 wherein said at least one second organic solvent is present in said ink-jet ink composition in an amount ranging from about 0.1 to about 20 wt %.

13. The composition of claim 12 wherein said at least one second organic solvent is present in said ink-jet ink composition in an amount ranging from about 0.1 to about 15 wt %.

14. The composition of claim 13 wherein said at least one second organic solvent is present in said ink-jet ink composition in an amount ranging from about 0.1 to about 10 wt %.

15. A method for ink-jet printing, comprising:
    providing a dye-based ink-jet ink composition comprising
        at least one dye; and
        a microemulsion comprising
            at least one water-insoluble organic compound;
            at least one second organic solvent miscible with the water-insoluble organic compound and water and having a miscibility of at least 10% both in water and in the water-insoluble organic compound;
            at least one hydrotropic amphiphile; and
            water, wherein said hydrotropic amphiphile is present in an amount sufficient to solubilize said at least one water-insoluble organic compound in said microemulsion; and,
    printing said ink composition on a printing medium by means of an ink-jet pen.

16. The method of claim 15 wherein said at least one dye is present in an amount from about 0.1 to about 10 wt %.

17. The method of claim 15 wherein said at least one water-insoluble organic compound is selected from the group consisting of water-insoluble ethyleneoxy oils, water-insoluble propyleneoxy oils, water-insoluble monoglycol ethers, water-insoluble polyglycol ethers, water-insoluble monoglycol phenyl ethers, water-insoluble polyglycol phenyl ethers, water-insoluble alcohols, water-insoluble monoglycol esters, water-insoluble polyglycol esters, water-insoluble terpenes, water-insoluble phenols, water-insoluble aldehydes and ketones, water-insoluble polyether modified polysiloxanes, and water-insoluble hydrocarbons.

18. The method of claim 17 wherein said at least one water-insoluble organic compound is selected from the group consisting of monoethylene glycol phenyl ethers, polyethylene glycol phenyl ethers, monopropylene glycol phenyl ethers, polypropylene glycol phenyl ethers, ethylene glycol esters, propylene glycol esters, polyethylene glycol esters, polypropylene glycol esters, toluene, xylenes, naphthalene, phenanthrene, benzyl alcohol, alpha-terpineol, citronellal, hydroxy citronellal, cyclohexyl methanol, cyclohexanone and its (C1 to C8) derivatives, cyclohexanol and its alkyl (C1 to C8) derivatives, cyclopentanone and its (C1 to C8) derivatives, cyclopentanol and its alkyl (C1 to C8) derivatives, eugenol, 1-heptanol, n-hexanol, 2-hexanol, n-pentanol, cinnamyl alcohol, cinnamaldehyde, m-cresol, 3-phenyl-1-propanol, salicylaldehyde, 2-ethyl-1,3-hexanediol, 7octene-1,2-diol, 2,2-diethyl-1,3-propanediol, 1-benzyl-2-pyrrolidinone, polycaprolactone triol, and 3-phenyl-1-propanol.

19. The method of claim 18 wherein said at least one water-insoluble organic compound is selected from the group consisting of monoethylene glycol phenyl ether, diethylene glycol phenyl ether, monopropylene glycol phenyl ether, dipropylene glycol phenyl ether, and benzyl alcohol.

20. The method of claim 15 wherein said at least one water-insoluble organic compound is present in said ink-jet ink composition in an amount ranging from about 1 to about 70 wt %.

21. The method of claim 20 wherein said at least one water-insoluble organic compound is present in said ink-jet ink composition in an amount ranging from about 1 to about 30 wt %.

22. The method of claim 15 wherein said at least one hydrotropic amphiphile is selected from the group consisting of salts of benzoic acid, salicylic acid, benzene sulfonic acid, benzene disulfonic acid, toluene sulfonic acid, xylene sulfonic acid, cumene sulfonic acid, cymene sulfonic acid, cinnamic acid, octane sulfonic acid, hexane sulfonic acid, butane sulfonic acid, and decane sulfonic acid; p-amino benzoic acid hydrochloride, procaine hydrochloride, caffeine; salts of alkylpyridium, alkyltrimethyl ammonium, benzyltrialkyl (C1 to C4) ammonium, and phenyltrimethyl ammonium cations; resorcinol, and pyrogallol.

23. The method of claim 22 wherein said at least one hydrotropic amphiphile is selected from the group consisting of sodium xylene sulfonate, sodium salicylate, and sodium benzoate.

24. The method of claim 15 wherein said at least one second organic solvent is selected from the group consisting of alkanolamines, lactams, glycols, diols, triols, glycol esters, mono- glycol ethers, di- glycol ethers, mid chain alcohols, oxyalkylated alcohols, acetylenic polyethylene oxides, polyethylene oxides, and polypropylene oxides.

25. The method of claim 24 wherein said at least one second organic solvent is selected from the group consisting of 2-pyrrolidone, 1,2-pentanediol, 1,5-pentanediol, ethylene glycol mono butyl ether, diethylene glycol ethers, diethylene glycol mono ethyl ether, diethylene glycol mono butyl ether, diethylene glycol mono hexyl ether, propylene glycol ether, dipropylene glycol ether, triethyleneglycol ether, 2-pentyl alcohol, acetylenic polyethylene oxide, polyethylene oxide, and polypropylene oxide.

26. The method of claim 15 wherein said at least one second organic solvent is present in said ink-jet ink composition in an amount ranging from about 0.1 to about 20 wt %.

27. The method of claim 26 wherein said at least one second organic solvent is present in said ink-jet ink composition in an amount ranging from about 0.1 to about 15 wt %.

28. The method of claim 27 wherein said at lest one second organic solvent is present in said ink-jet ink composition in an amount ranging from about 0.1 to about 10 wt %.

* * * * *

UNITED STATES PATENT AND TRADEMARK OFFICE
CERTIFICATE OF CORRECTION

PATENT NO. : 6,019,827
DATED : February 1, 2000
INVENTOR(S) : Wickramanakye et al It is certified that error appears in the above-identified patent and that said Letters Patent is hereby corrected as shown below:

On the title page: Item [63]
--which is a Continuation-in-part of application No. 08/528,072, Sep. 14, 1995, Pat. No. 5,565,022--.

In Claim 2, line 2 delete "(up to)".

In Claim 25, line 4 delete "diethylene glycol ethers".

Signed and Sealed this

Twentieth Day of February, 2001

*Attest:*

NICHOLAS P. GODICI

*Attesting Officer*     *Acting Director of the United States Patent and Trademark Office*